(12) United States Patent
Dee

(10) Patent No.: US 7,733,603 B2
(45) Date of Patent: Jun. 8, 2010

(54) REDUCED TAPE STICK TAPE DRIVE SYSTEMS

(75) Inventor: Richard H. Dee, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 614 days.

(21) Appl. No.: 11/674,443

(22) Filed: Feb. 13, 2007

(65) Prior Publication Data

US 2008/0192380 A1     Aug. 14, 2008

(51) Int. Cl.
  *G11B 5/187*     (2006.01)
(52) U.S. Cl. ....................................................... 360/122
(58) Field of Classification Search .................. 360/122
  See application file for complete search history.

(56) References Cited

U.S. PATENT DOCUMENTS 5,169,703 A * 12/1992 Miyazaki et al. ............ 428/141
6,103,367 A * 8/2000 Weir et al. ................... 428/336
6,212,040 B1   4/2001 Hungerford
6,307,720 B1 * 10/2001 Hayakawa ................... 360/313
2006/0024531 A1 * 2/2006 Murakami ................... 428/827
2006/0124585 A1 * 6/2006 Suwa et al. .................... 216/22

OTHER PUBLICATIONS

Bharat Bhushan, Tribology and Mechanics of Magnetic Storage Devices, 1990, pp. 231-365, Springer-Verlag New York, Inc., New York, NY.

* cited by examiner

*Primary Examiner*—Allen T Cao
(74) *Attorney, Agent, or Firm*—Brooks Kushman P.C.

(57) ABSTRACT

A read and/or write head for a tape drive system has a tape bearing surface that includes relatively smooth areas surrounded by relatively rough areas. Read and/or write elements are located in the smooth areas.

15 Claims, 4 Drawing Sheets

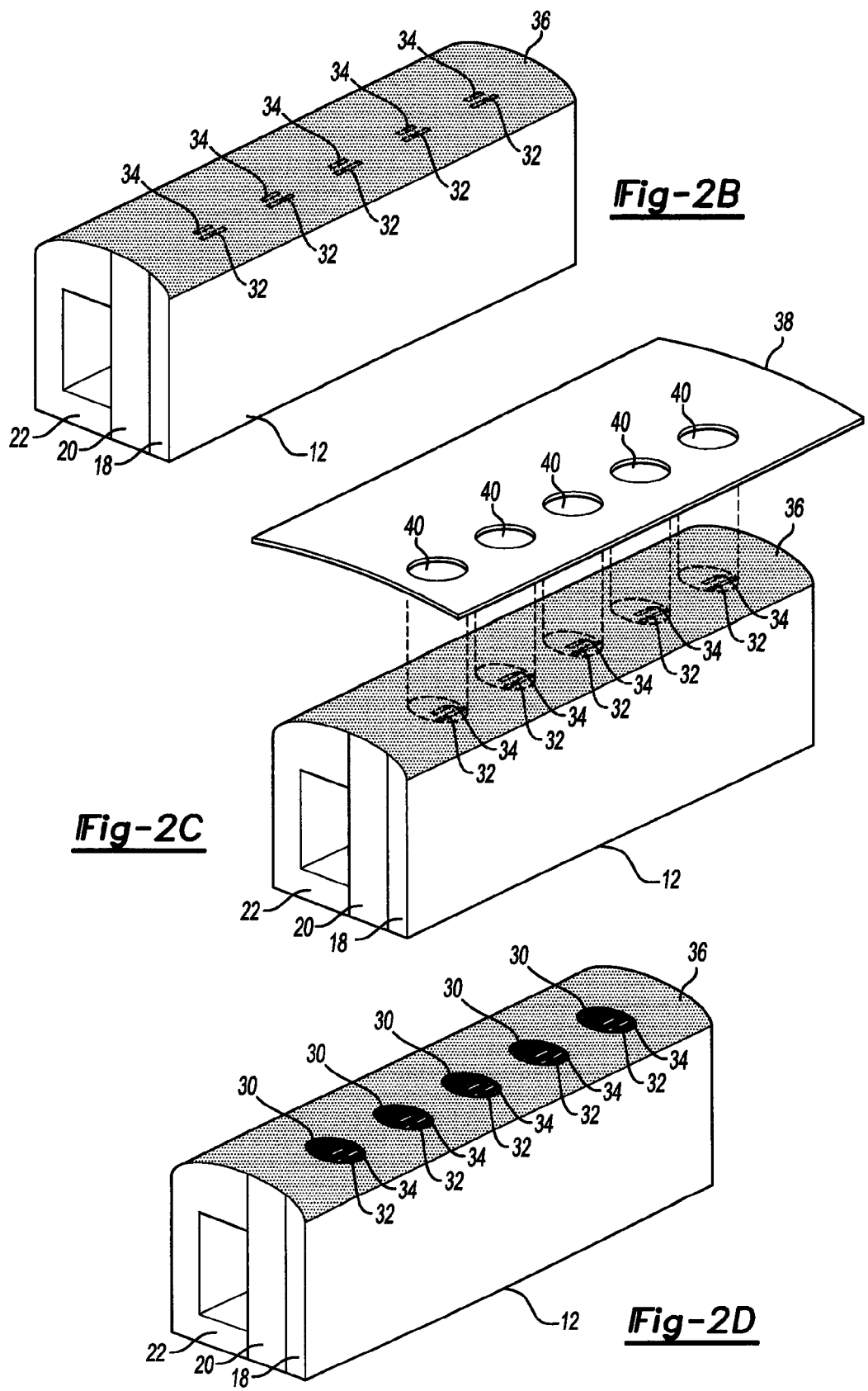

REDUCED TAPE STICK TAPE DRIVE SYSTEMS

BACKGROUND OF THE INVENTION

1. Field of the Invention

The invention relates to reduced tape stick tape drive systems.

2. Discussion

Magnetic tape may stick to heads and other tape path components of tape drive systems. Whether a magnetic tape sticks may depend on the media formulation, the contact surface area, the smoothness of surfaces that tend to adhere to one another, and the spacing between head recording elements and recording media.

SUMMARY

Embodiments of the invention may take the form of a linear tape head module for a linear tape drive system. The system includes a tape having a data track. The module includes a substrate having a surface with a roughness and a thin film having a surface with a roughness. The thin film includes a data track element to at least one of read from and write to the data track. The module also includes a closure having a surface with a roughness to cap the thin film. The substrate, thin film, and closure surfaces cooperate to provide a tape bearing surface for the tape. The roughness of a predefined portion of the tape bearing surface is less than the roughness of the tape bearing surface outside the predefined portion.

Embodiments of the invention may take the form of a magnetic head assembly for use with a magnetic medium. The assembly includes a bearing surface for the magnetic medium having a roughness. The roughness of a predefined area of the bearing surface is less than a roughness of the bearing surface outside the predefined area. The assembly also includes a transducer for at least one of reading from and writing to the magnetic medium. The transducer is located in the predefined area.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2B is a perspective view of the linear tape head module of FIG. 2A and shows the tape bearing surface covered with a photosensitive material.

FIG. 2C is a perspective view of the linear tape head module of FIG. 2B and shows the mask used during exposure of the photosensitive material.

FIG. 2D is a perspective view of the linear tape head module of FIG. 2C and shows the photosensitive material after exposure.

DETAILED DESCRIPTION

Figure 1A:
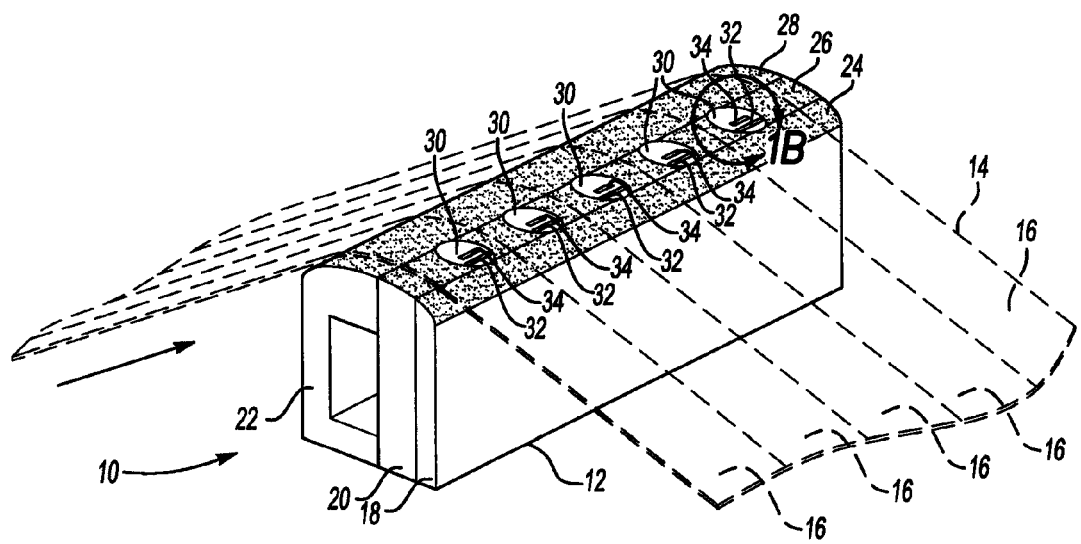
FIG. 1A is a perspective view of portions of a linear tape drive system and shows the tape bearing surface with predefined smooth regions to reduce tape stick.

FIG. 1A is a perspective view of portions of linear tape drive system 10. System 10 includes linear tape head module 12 and tape 14. Tape 14 has a path direction, as indicated by arrow, and includes data tracks 16. Linear tape head module 12 includes substrate 18, thin film region 20, and cap 22. Substrate 18, thin film region 20, and cap 22 each have respective tape bearing surfaces 24, 26, 28 on which tape 14 rides. As explained below, the surface roughness of tape bearing surfaces 24, 26, 28 varies to reduce tape stick.

Figure 1B:
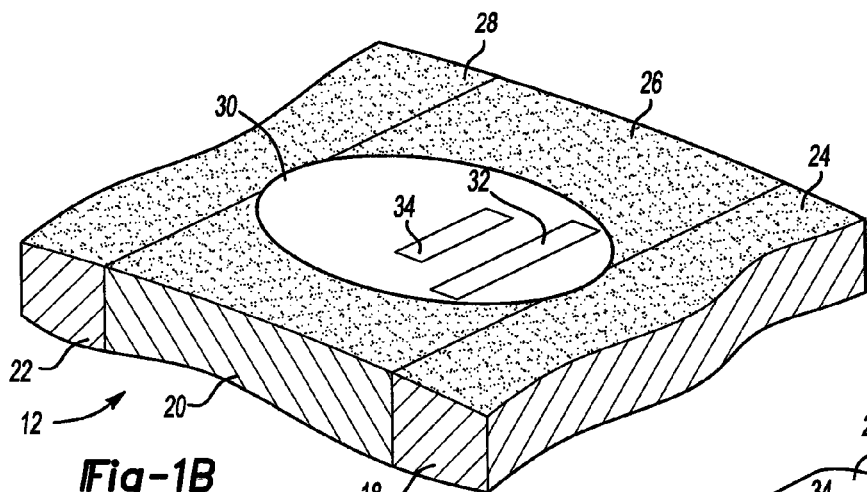
FIG. 1B is an enlarged view of a portion of the linear tape head module of FIG. 1A taken about line 1B of FIG. 1A and shows the magnetic transducers located within the smooth region.

FIG. 1B is an enlarged view of a portion of linear tape head module 12 of FIG. 1A taken about line 1B of FIG. 1A. The surface roughness of smooth region 30 is less than the surface roughness outside of smooth region 30. That is, the surface roughness of tape bearing surfaces 24, 26, 28 outside of smooth region 30 is rougher compared to that within smooth region 30. At its widest, smooth region 30 is 20 micrometers. In other embodiments, smooth region may be wider or narrower, e.g., 5 to 100 micrometers. In still other embodiments, smooth region 30, at its widest, is wider than magnetic transducer elements 32, 34. Because portions of tape bearing surfaces 24, 26, 28 are textured, tape 14 is less likely to stick to linear tape head module 12.

Magnetic transducer elements 32, 34, e.g., a shield and pole tip of a read/write sensor, are constructed on the substrate within thin film region 20. Magnetic transducer elements 32, 34, in the embodiment of FIG. 1B, read and/or write data to data track 16 of tape 14. In other embodiments, a fewer or greater number of magnetic transducer elements may be included in smooth region 30.

Figure 2A:
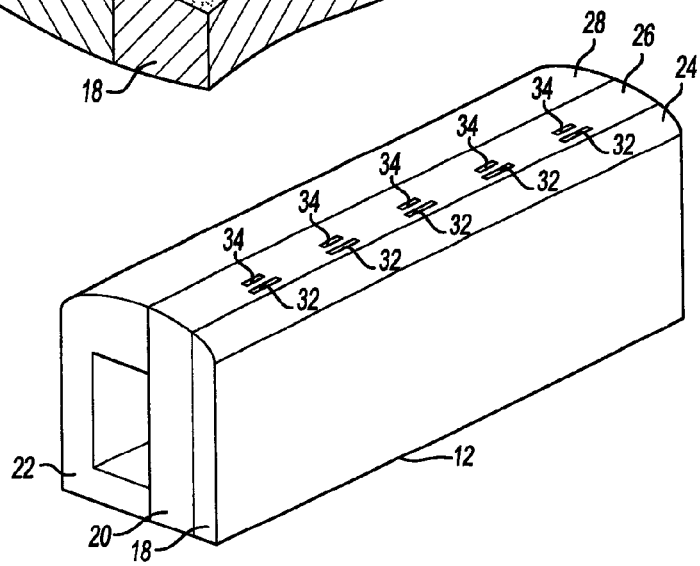
FIG. 2A is a perspective view of the linear tape head module of FIG. 1A and shows the tape bearing surface to be relatively smooth prior to any further processing.

FIGS. 2A through 2F illustrate a process to form smooth regions 30 on tape bearing surfaces 24, 26, 28. FIG. 2A is a perspective view of linear tape head module 12 showing tape bearing surfaces 24, 26, 28 to be relatively smooth prior to any further processing.

FIG. 2B is a perspective view of linear tape head module 12 showing tape bearing surfaces 24, 26, 28 covered with a photosensitive material, e.g., a photo resist, used in thin film processing.

FIG. 2C is a perspective view of linear tape head module 12 showing mask 38 including dies 40 used during exposure of photosensitive material 36. Dies 40 create the shape of smooth regions 30. Dies 40 may take any desired shape including circular, elliptical, square, rectangular, diamond, etc. In some embodiments, dies 40 are elongated relative to the path direction of tape 14. The resulting smooth regions are likewise elongated relative to the path direction of tape 14.

FIG. 2D is a perspective view of linear tape head module 12 showing photosensitive material 36 after exposure. Magnetic transducer elements 32, 34 are shown for purposes of illustrating their location within region 30.

Figure 2E:
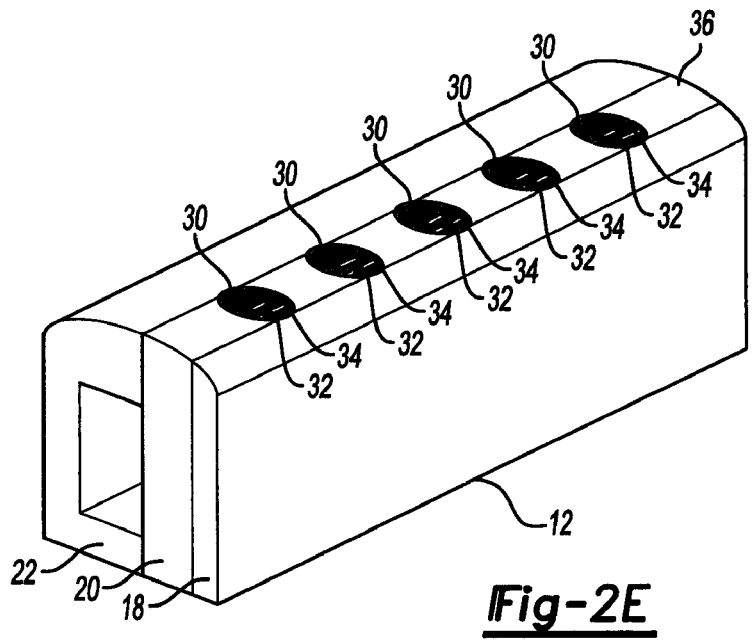
FIG. 2E is a perspective view of the linear tape head module of FIG. 2D and shows the tape bearing surface after the unexposed photosensitive material has been removed.

FIG. 2E is a perspective view of linear tape head module 12 after the unexposed photosensitive material 36 has been chemically removed. The exposed photosensitive material 36 will define the shape of smooth regions 30.

Figure 2F:
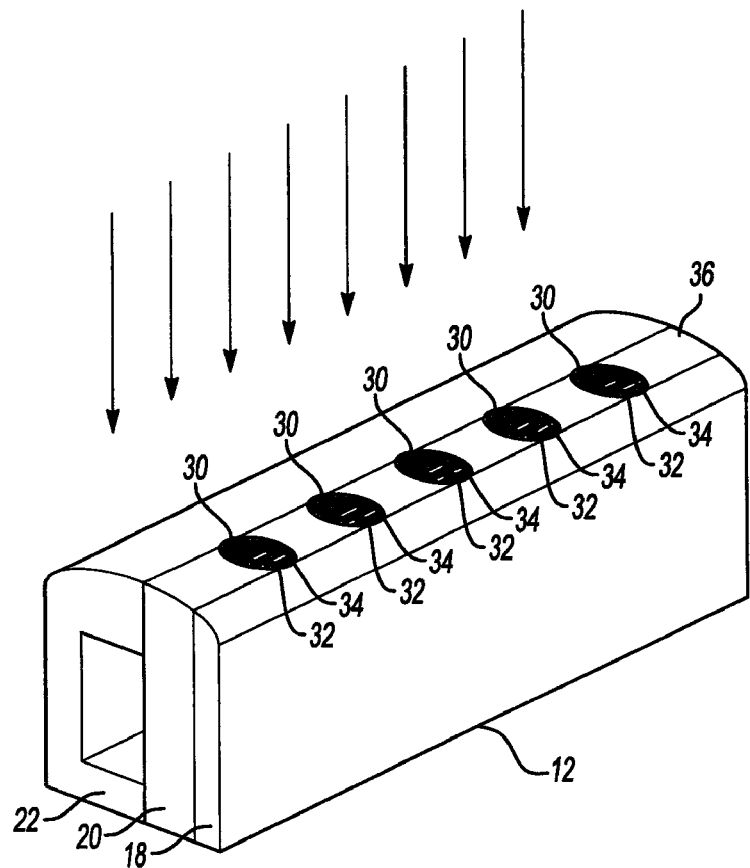
FIG. 2F is a perspective view of the linear tape head module of FIG. 2E and shows the unprotected portions of the tape bearing surface being etched to create a slightly rougher surface relative to the surface protected by the exposed photosensitive material.

FIG. 2F is a perspective view of linear tape head module 12 showing the unprotected portions of tape bearing surfaces 24, 26, 28 being etched to create a slightly rougher surface relative to the surface protected by the exposed photosensitive material. Several techniques may be used to etch the unprotected tape bearing surfaces 24, 26, 28 including wet etching, ion beam etching, reactive ion etching, and sputter etching. Once etched, the exposed photosensitive material 36 may be chemically removed to reveal smooth regions 30 as depicted in FIGS. 1A and 1B. The resulting tape bearing surfaces 24, 26, 28 have slightly raised smooth regions 30 where the magnetic transducer elements 32, 34 are within surrounding fields of slightly rougher contoured surfaces.

Other processes may be used to pattern smooth regions 30. For example, the negative process to that described above could be used. The fields are exposed to the light, rather than the raised regions, using a mask of opposite polarity and then removed chemically leaving the regions to be untouched covered with photoresist. Also, alternate methods of patterning could be used, e.g., electron beam photolithography, focused ion beam etching.

Figure 3:
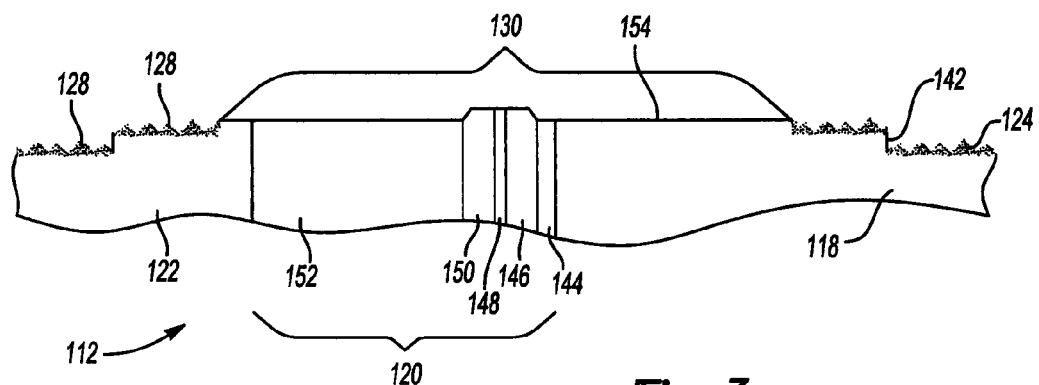
FIG. 3 is a side view, in cross-section and partially broken away, of an alternative embodiment of a linear tape head module and shows the tape bearing surface including a mesa.

FIG. 3 is a side view, in cross-section and partially broken away, of an alternative embodiment of linear tape head module 112. Numbered elements differing by factors of 100 have similar descriptions, e.g., linear tape head modules 12, 112 have similar descriptions. Substrate 118 provides a foundation for the fabrication of thin film region 120. Substrate 118 is made of a durable material, such as Aluminum Titanium Carbide. Thin film region 120 is formed of alternating layers of a non-magnetic insulating material and a soft magnetic material that define undercoat 144, bottom pole tip 146, pole tip gap 148, top pole tip 150, and overcoat 152. In some embodiments, undercoat 144, pole tip gap 148, and overcoat 152 are made of Alumina Oxide. Bottom pole tip 146 and top pole tip 150 are made of Cobalt Zirconium Tantalum. Other materials may also be used. Cap 122 caps thin film region 120. Cap 122 is made of the same material as substrate 118 to provide symmetrical characteristics on either side of thin film region 120.

Raised portion 142 is formed by removing the surrounding material in tape bearing surfaces 124, 126, 128. Raised portion surface 154 is milled slightly making bottom pole tip 146, pole tip gap 148, and top pole tip 150 the highest elements above tape bearing surfaces 124, 126, 128, and thus the first elements that contact tape 114 (not shown). The structure of FIG. 3 can be repeated across the width of linear tape head module 112 to produce a multi-track magnetic write head. In alternative embodiments, other types of right and/or read transducers, using different materials and different patterns, may be formed in raised portion 142.

The distance that pole tips 146, 150 protrude from raised portion surface 154 and the distance that raised portion 142 protrudes from tape bearing surfaces 124, 126, 128 are selected based on the wear rate of the materials used and the planned lifetime of linear tape head module 112. At a minimum, the onset of pole tip recession is delayed due to the extra distance that pole tips 146, 150 must wear as compared with tape bearing surfaces 124, 126, 128. In some embodiments, raised portion 142 and pole tips 146, 150 initially protrude sufficiently so that pole tips 146, 150 do not wear below tape bearing surfaces 124, 126, 128 over the planned lifetime of linear tape head module 112. In embodiments using Aluminum Titanium Carbide to form substrate 118 and cap 122, Alumina Oxide in the film region 120, and Cobalt Zirconium Tantalum for poles 146, 150, raised portion 142 protrudes above tape bearing surfaces 124, 126, 128 approximately 0.8 micrometers. Pole tips 146, 150 and pole tip gap 148 protrude above raised portion surface 154 approximately 0.2 micrometers.

Figure 4:
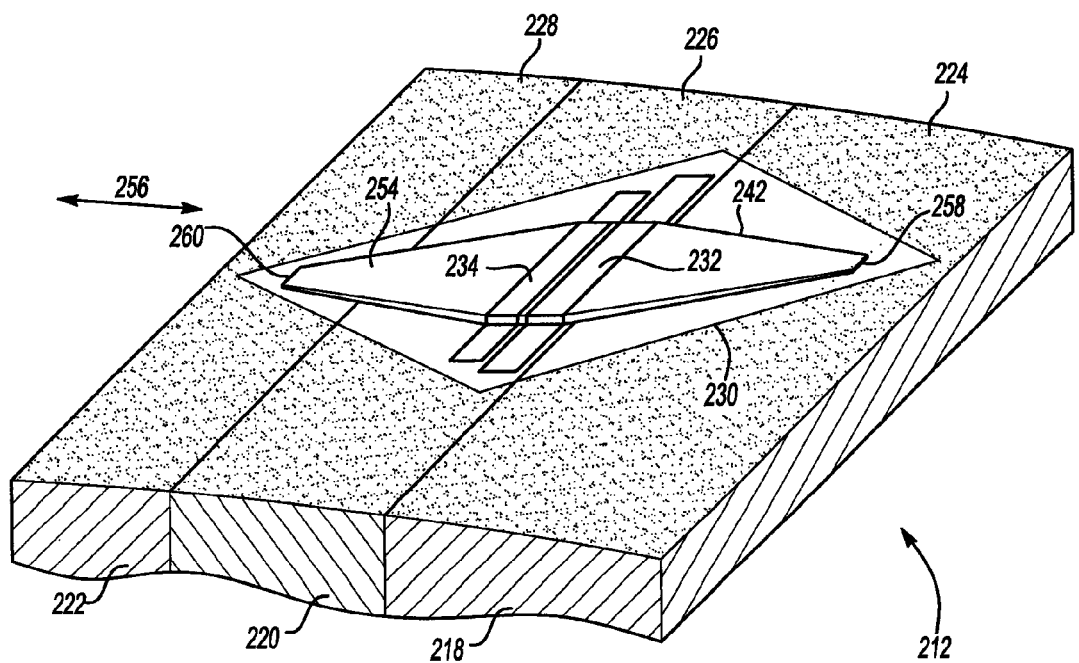
FIG. 4 is a perspective view of a portion of an alternative embodiment of a linear tape head module and shows the tape bearing surface including a tapered mesa.

FIG. 4 is a perspective view of a portion of an alternative embodiment of linear tape head module 212 showing a tapered raised portion 242. The structure of FIG. 4 can be repeated for linear tape head modules having multiple transducers. Tape 214 (not shown) moves relative to magnetic transducers 232, 234 along longitudinal axis 256 of tape bearing surfaces 224, 226, 228. To avoid sharp edges, the height of raised portion surface 254 tapers along longitudinal axis 256 towards tape bearing surfaces 224, 228. Raised portion surface 254 is at a maximum distance from tape bearing surfaces 224, 226, 228 adjacent magnetic transducers 232, 234 within thin film region 220, and at a smaller distance, or flush with tape bearing surfaces 224, 228 at outer ends 258, 260 respectively. To help steer debris around magnetic transducers 232, 234, the width of raised portion surface 254 is also tapered along longitudinal axis 256. Raised portion surface 254 has a maximum width adjacent magnetic transducers 232, 234, and a narrow width at outer ends 258, 260. In other embodiments, tapered raised portion 242 may be implemented using read transducers, and combinations of read and write transducers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A linear tape head module for a linear tape drive system, the system including a tape having a data track, the module comprising:
   a substrate having a surface with a roughness;
   a thin film, having a surface with a roughness, including a data track element to at least one of read from and write to the data track; and
   a closure having a surface with a roughness to cap the thin film wherein the substrate, thin film, and closure surfaces cooperate to provide a tape bearing surface for the tape and wherein a roughness of a predefined portion of the tape bearing surface is less than a roughness of the tape bearing surface outside the predefined portion.

2. The module of claim 1 wherein the data track element includes at least one of a pole tip and shield located in the predefined portion of the tape bearing surface.

3. The module of claim 2 wherein the data track element includes a pole tip and wherein the pole tip protrudes a distance above the tape bearing surface.

4. The module of claim 2 wherein the data track element includes a shield and wherein the shield protrudes a distance above the tape bearing surface.

5. The module of claim 2 wherein the thin film surface includes a plateau to further provide a tape bearing surface for the tape.

6. The module of claim 5 wherein the data track element includes a pole tip and wherein the plateau includes the pole tip.

7. The module of claim 6 wherein the pole tip protrudes a distance above a surface of the plateau.

8. The module of claim 5 wherein the data track element includes a shield and wherein the plateau includes the shield.

9. The module of claim 8 wherein the shield protrudes a distance above a surface of the plateau.

10. The module of claim 5 wherein a height of the plateau varies.

11. The module of claim 5 wherein the plateau has a predefined shape.

12. The module of claim 5 wherein the plateau has a polygonal shape.

13. The module of claim 1 wherein the predefined portion of the thin film surface has a rounded shape.

14. The module of claim 1 wherein the predefined portion of the thin film surface has an elliptical shape.

15. The module of claim 1 wherein the tape has a path direction and wherein the predefined portion of the thin film surface has an elongated shape in the path direction.

* * * * *